Figure 1:
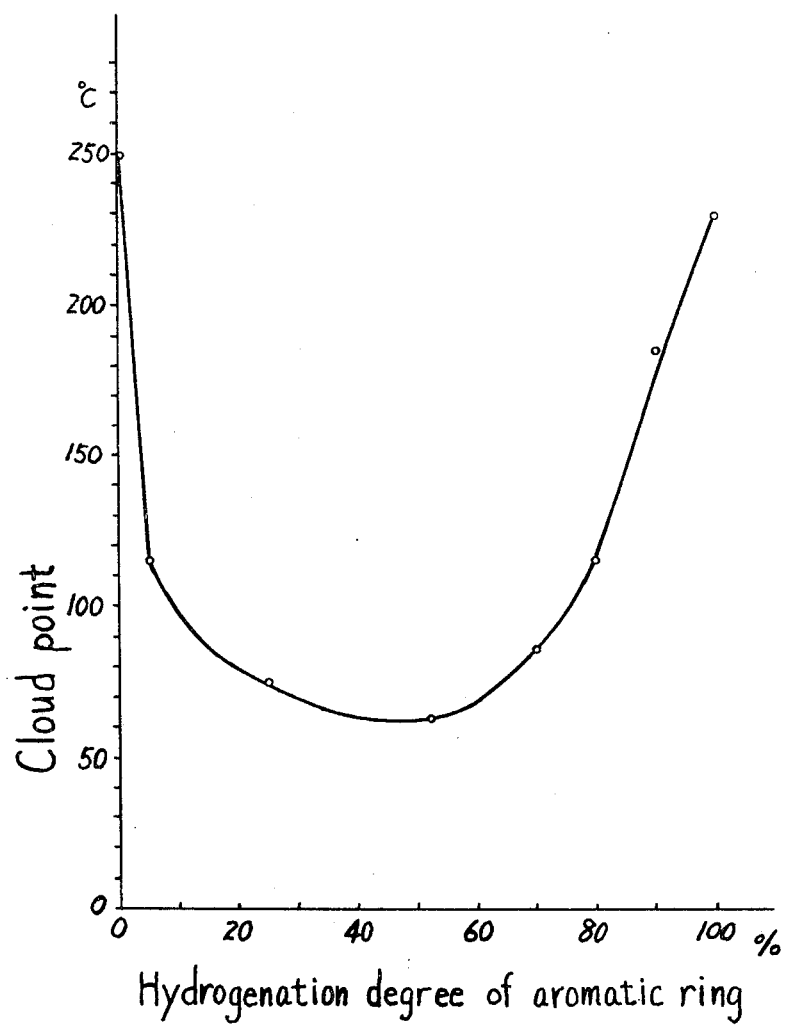

ize et al.

United States Patent [19]
Shimizu et al.

[11] 3,926,878

[45] Dec. 16, 1975

[54] HOT-MELT COMPOSITIONS COMPRISING E/VA COPOLYMER AND HYDROGENATED PETROLEUM RESIN

[75] Inventors: Katsuhisa Shimizu, Kyoto; Norio Minami, Kawachinagano, both of Japan

[73] Assignee: Arakawa Rinsan Kagaku Kogyo Kabushiki Kaisha, Osaka, Japan

[22] Filed: Jan. 16, 1973

[21] Appl. No.: 324,224

[30] Foreign Application Priority Data
Jan. 24, 1972  Japan.................................. 47-9187

[52] U.S. Cl. ...... 260/27 EV; 260/27 R; 260/28.5 A; 260/28.5 AV; 260/28.5 C; 260/829; 260/897 B; 161/218; 161/251; 117/155 UA; 117/161 UC
[51] Int. Cl.²......................................... C08L 23/08
[58] Field of Search ............. 260/897, 28.5, 829, 27

[56] References Cited
UNITED STATES PATENTS
| | | | |
|---|---|---|---|
| 3,245,931 | 4/1966 | Matthew............................ | 260/28.5 |
| 3,401,132 | 9/1968 | Eihl et al. .......................... | 260/28.5 |
| 3,644,252 | 2/1972 | Shenfield et al..................... | 260/897 |
| 3,697,468 | 10/1972 | Ballard............................... | 260/28.5 |

FOREIGN PATENTS OR APPLICATIONS
| | | | |
|---|---|---|---|
| 1,024,718 | 4/1966 | United Kingdom................. | 260/897 |

*Primary Examiner*—Carmen J. Seccuro
*Attorney, Agent, or Firm*—Larson, Taylor and Hinds

[57] ABSTRACT

A hot-melt composition comprising a hydrogenated aromatic petroleum resin and an ethylene-unsaturated ester copolymer, said hydrogenated aromatic petroleum resin being prepared by polymerizing a cracked petroleum fraction boiling between −10° and 280°C and containing unsaturated hydrocarbons at least 50 percent by weight of which is polymerizable aromatic hydrocarbon and hydrogenating the resulting aromatic hydrocarbon resin to a hydrogenation degree of aromatic ring of 5 to 80 percent.

6 Claims, 2 Drawing Figures

HOT-MELT COMPOSITIONS COMPRISING E/VA COPOLYMER AND HYDROGENATED PETROLEUM RESIN

This invention relates to a hot-melt composition, more particularly to a hot-melt composition incorporating therein a specific petroleum resin.

Hot-melt compositions have quick initial tack when molten, and yet when cooled, harden rapidly to give a strong bond, and are free of toxicity and fire hazard problems associated with solvent systems. Accordingly they are widely used as adhesives and coating agents for various substrates such as metal, paper, wood, plastics, etc.

The hot-melt composition is in the form of rod, grains or pellets at room temperature for ease of handling, while it is applied hot in a molten state to a substrate and then solidified by cooling for adhesion or coating. Thus it is desired that the hot-melt composition have low melt viscosity to assure an easy applying operation.

Conventionally, such hot-melt composition is prepared from high molecular weight materials, particularly from copolymers of ethylene with unsaturated esters which are inexpensive and excellent in rigidity, softness and flexibility. Among these, most commonly used are copolymer of ethylene with vinyl acetate and copolymer of ethylene with acrylates. However, these copolymers have the drawback of high melt viscosity to result in poor handleability and low adhesion to various substrates. Therefore, it is usually practiced to incorporate waxes to lower the viscosity in a molten state or to use thermoplastic resins to improve adhesion. The thermoplastic resins used for this purpose include rosin esters, polyterpene resins petroleum resins, coumarone-indene resins, etc. Among which rosin esters are found to be very suitable because they have excellent adhesive properties and compatibility with ethylene-unsaturated ester copolymers, but there are various limitations on their industrial uses, inasmuch as they are natural products. On the other hand, petroleum resins and coumarone-indene resins, which are obtained from abundant petroleum materials, are available inexpensively and stably, whereas they are much inferior to rosin esters in the adhesive properties and compatibility with ethylene-unsaturated ester copolymers. Accordingly, if it becomes possible to obtain from abundant petroleum materials a resin which has excellent compatibility with ethylene-unsaturated ester copolymers and is as effective as resin esters to impart excellent adhesive properties to the resulting composition, such resin will be of immense industrial value, but no resin has been provided yet up to date which fulfils such demand.

An object of this invention is to provide a modified petroleum resin for the hot-melt composition having excellent adhesive properties comparable to those of rosin esters and high compatibility with ethylene-unsaturated ester copolymers.

Another object of this invention is to provide a hot-melt composition having excellent adhesive properties.

Another object of this invention is to provide a hot-melt composition having excellent adhesive properties and low melt viscosity.

These and other objects of this invention will become apparent from the following detailed description.

The hot-melt composition of the present invention comprises a hydrogenated aromatic petroleum resin and an ethylene-unsaturated ester copolymer, said hydrogenated aromatic petroleum resin being prepared by polymerizing a petroleum fraction containing unsaturated hydrocarbons at least 50 percent by weight of which is at least one polymerizable aromatic hydrocarbon and hydrogenating the resulting resin to a hydrogenation degree of aromatic ring of 5 to 80 percent. The "hydrogenation degree of aromatic ring" or "hydrogenation degree" referred to herein is determined by the following equation based on the infrared absorbancy at 700 cm$^{-1}$.

$$\text{Hydrogenation degree of aromatic ring (\%)} = \left(1 - \frac{\text{Absorbancy at 700 cm}^{-1}\text{ of petroleum resin after hydrogenation}}{\text{Absorbancy at 700 cm}^{-1}\text{ of petroleum resin before hydrogenation}}\right) \times 100$$

The present invention has been accomplished based on a novel finding that when the aromatic rings contained in aromatic petroleum resins are subjected to hydrogenation to a specific hydrogenation degree of 5 to 80 percent, the resulting hydrogenated aromatic petroleum resin has greatly improved compatibility with ethylene-unsaturated ester copolymers and exhibits outstanding adhesive properties comparable to those of rosin esters.

The aromatic petroleum resin to be used in this invention is prepared from a petroleum fraction containing at least 50 weight % of polymerizable aromatic hydrocarbons based on the total weight of the unsaturated hydrocarbons contained therein. The polymerizable aromatic hydrocarbons include aromatic hydrocarbons having a polymerizable double bond either on the side chain or in the condensed ring. Examples thereof are styrene, α-methyl styrene, vinyl toluene, vinyl xylene, propenyl benzene, indene, methyl indene, ethyl indene, etc. Usually the above starting fraction is obtained by cracking or reforming petroleum naphtha and boils in the range of −10° to 280°C, preferably 10° to 260°C. Such petroleum fractions may contain unsaturated hydrocarbons other than polymerizable aromatic hydrocarbons. The unsaturated hydrocarbons other than polymerizable aromatic hydrocarbons may include cyclic olefins and diolefins such as cyclopentene, cyclopentadiene, dicyclopentadiene, cyclohexene, cyclooctene, etc., and aliphatic olefins and diolefins such as butene, butadiene, pentene, pentadiene, octadiene, etc. The fraction may further contain paraffins, alkylbenzenes and the like non-polymerizable substances.

The above fraction may be polymerized by conventional methods. In one of the preferred methods the polymerization is carried out in organic solvent in the presence of a radical catalyst or Friedel-Crafts catalyst, generally at −50° to 100°C under atmospheric or increased pressure for 2 to 8 hours. The resultant resin from which the catalyst and solvent are removed is in oily to mass form, colorless or brown in color. Preferable resin has a molecular weight of 400 to 3,000 and a softening point of 60° to 150°C., although the physical properties can be varied by the starting distillate used and polymerization conditions.

According to this invention, the aromatic petroleum resin is then hydrogenated. The hydrogenation degree exerts an important effect on the compatibility with ethylene-unsaturated ester copolymers and adhesive properties of the resulting resin. According to this invention, it is essential that the aromatic rings are hydrogenated to a hydrogenation degree of 5 to 80 percent. We have revealed that marked changes in compatibility with ethylene-unsaturated ester copolymers occur at the hydrogenation degrees about 5 and 80 percent. If the degree is below 5 or above 80 percent, the resin will exhibit greatly reduced compatibility with ethylene-unsaturated ester copolymers and very low adhesive properties. Thus, only when hydrogenation is effected to a hydrogenation degree ranging from 5 to 80 percent, the resulting resin shows excellent compatibility with the ethylene-unsaturated ester copolymers and gives a hot-melt composition having remarkably improved adhesive properties. The hydrogenation degree of aromatic ring is most preferably in the range of 30 to 80 percent to assure very high compatibility and adhesive properties.

The method of hydrogenation is not particularly limited but conventionally known methods may be adopted. For instance, the hydrogenation may be carried out at a temperature ranging from 200° to 300°C and pressure between 10 and 300 kg/cm² in the presence of a known hydrogenating catalyst such as nickel, palladium, cobalt, ruthenium, platinum, rhodium, the conditions being such as to produce resins with a hydrogenation degree of 5 to 80 percent. If the hydrogenation degree is below 5 percent, an excellent effect as achieved by this invention is unavailable, even where the double bonds on the side chains in the resin are completely saturated, whereas conditions resulting in more than 80 percent hydrogenation degree are not applicable to this invention.

Examples of the ethylene-unsaturated ester copolymers to be used in this invention are those comprising ethylene monomer and unsaturated esters in the weight ratio between 90 : 10 and 60 : 40, preferably between 80 : 20 and 65 : 35. The unsaturated esters to be used include vinyl acetate, methylacrylate, ethylacrylate, etc., among which vinyl acetate is particularly preferable. The ethylene-unsaturated ester copolymer may preferably be those having a melt index between about 1 and 400, especially between about 15 and 400.

The hot-melt composition of this invention is prepared from a hydrogenated aromatic petroleum resin and an ethylene-unsaturated ester copolymer. Although the ratio between the two ingredients may vary depending on the kind of the ethylene-unsaturated ester copolymer used and the use of the resulting hot-melt composition, about 10 to 100 parts by weight of the hydrogenated aromatic petroleum resin is usually used per 100 parts by weight of the ethylene-unsaturated ester copolymer. Since the hot-melt composition of this invention incorporates therein a hydrogenated aromatic petroleum resin, the hot-melt composition per se has a fairly low melt viscosity, assuring satisfactory application to the substrate without conjoint use of wax, but for further improved handleability, it is preferable to conjointly use wax to obtain a composition having lower melt viscosity. For this purpose, wax may generally substitute for about not more than 75 percent by weight of the ethylene-unsaturated ester copolymers. The wax may suitably be mineral waxes which are easily available and have excellent properties, the examples thereof being paraffin wax, polyethylene wax, polypropylene wax, microcrystalline wax, etc. Other animal or vegetable waxes may also be used.

By varying the proportions of the hydrogenated aromatic petroleum resin and ethylene-unsaturated ester copolymers, and of wax if desired, the hot-melt composition of this invention will be rendered applicable to a wide variety of uses. For instance, where especially high cohesive force, excellent rigidity and flexibility are required for building materials, an ethylene-unsaturated ester copolymers which are excellent in cohesive force, rigidity and flexibility are used in combination with a hydrogenated aromatic petroleum resin without using waxes to prepare a hot-melt composition. Further if waxes are substituted for ethylene-unsaturated ester copolymers, a relatively small amounts of wax may preferably be used for advantageous use especially as an adhesive and a relatively great amounts of wax may be used for preferable use as a coating agent.

The hot-melt composition of this invention may further incorporates therein rosin esters, polyterpenes, petroleum resin, coumarone-indene resin, etc. Various additives such as anti-oxidants, plasticizers and fillers may also be used conjointly.

The hot-melt composition of this invention has very remarkable adhesion to substrates having high polarity such as paper, wood, etc., and excellent adhesion to substrates of low polarity like plastics etc. as well, hence applicable to a wide variety of fields, for example for adhesion of paper, plastic films and sheets, bookbinding, adhesion of soles of footgear, production of laminates, production of plywood for furniture industry, adhesion of paper to metal or plastics, or of metal to plastics, coating of paper, fibers, plastic films or sheets, metal, etc.

In the case where the present composition is used as an adhesive, the composition in a molten state is applied with a roll coater or applicator to the surface of a substrate in an amount from about 5 to 50 g/m², and another substrate is adhered over the coated surface, while the composition is in a molten state, followed by cooling for solidification. Alternatively, after application and subsequent cooling, the adhesive is melted by reheating as desired, and adhered to another substrate, followed by cooling for solidification. Further when using the present composition as a coating agent, it is melted by heating and applied to the surface of a substrate with a roll coater or applicator usually in an amount from about 3 to 15 g/m². Alternatively, the substrate is passed through a molten layer of the heated composition to coat or impregnate the surface of the material with the composition, followed by cooling for solidification.

To clarify the features of this invention, examples are given below.

EXAMPLE 1

Preparation of hydrogenated aromatic petroleum resin

Under agitation and water-bath cooling 120 g of boron trifluoride etherate was added dropwise to 12 Kg of a fraction boiling in the range of 140° to 200°C obtained by thermal cracking of petroleum naphtha. The mixture was continuously agitated for further 3 hours at about 25°C after the termination of heat generation. One liter of 5 wt.% aqueous solution of caustic soda was thereafter added to the mixture, followed by vigorous agitation for 1 hour to decompose the catalyst. The resulting aqueous phase was separated off. The product obtained was subsequently washed with water three times and then distilled to give 5.1 Kg of a mass of aromatic hydrocarbon resin of brown color as a residue. The composition of the fraction used as the raw material and the properties of the resin obtained are as follows:

Composition of the starting fraction

| Composition of the starting fraction | | |
|---|---|---|
| styrene | 2% | by weight |
| α-methylstyrene | 5% | " |
| vinyltoluene | 18% | " |
| indene | 13% | " |
| ethylbenzene | 2% | by weight |
| xylene | 4% | " |
| trimethylbenzene | 24% | " |
| n-propylbenzene | 13% | " |
| diethylbenzene | 4% | " |
| others | 15% | " |

Properties of aromatic hydrocarbon resin color 14 (Gardner, ASTM D154-58), softening point 124°C (ring and ball method), number average molecular weight 840.

Five hundred grams of the aromatic petroleum resin thus obtained was dissolved in the same amount of cyclohexane, and the solution was heated in an autoclave under a hydrogen pressure of 200 kg/cm$^2$ at a temperature of 280°C for various periods in the presence of 20 g of Raney nickel catalyst to prepare seven kinds of resins having various hydrogenation degree of aromatic ring.

Compatibility test

Two grams of the resulting hydrogenated aromatic petroleum resins and 2 g of unhydrogenated resin (the aromatic hydrocarbon resin prepared in Example 1) were placed respectively into test tubes with 1.5 cm in diameter and 16.5 cm in depth, and 2 g of ethylene-vinyl acetate copolymer ("Evaflex 250," trade mark, product of Mitsui Polychemical Co., Ltd., Japan) containing 28 percent by weight of vinyl acetate and having a melt index of 15 g/10 min. was placed into each of the test tubes. The resulting mixture was melted by heating to 200°C and mixed uniformly. The mixture was further heated to a temperature of 250°C and then left to cool. To determine the cloud point as an indication of compatibility, the temperature was measured at which the mixture began to cloud. The results are given in FIG. 1, which apparently shows that the resins having hydrogenation degrees of aromatic ring of 5 to 80 percent have excellent compatibility with the ethylene-vinyl acetate copolymer but that those having hydrogenation degrees of aromatic ring of below 5 and above 80 percent and the unhydrogenated resin have poor compatibility.

Preparation of hot-melt compositions

Thirty-three parts by weight of each of the 8 kinds of resins and commercial perhydrogenated rosin ester ("FORAL-85," trade mark, product of Hercules Incorporated, U.S.A.), 33 parts by weight of ethylene-vinyl acetate copolymer ("Evaflex 220," trade mark, product of Mitsui Polychemical Co., Ltd., Japan) containing 28 percent by weight of vinyl acetate and having a melt index of 150 g/10 min. and 33 parts by weight of paraffin wax ("HM-2050," trade mark, product of Nihon Seiro Co., Ltd., Japan) melting at 70°C were melted and mixed uniformly to prepare hot-melt adhesive compositions.

Next, bleached sulfite paper was placed on a hot plate with a controlled surface temperature of about 130°C, and the adhesive composition heated to about 180°C was poured onto the paper and spread with an applicator to a thickness of 1 mil. The substrate listed in Table 1 was pressed against the coated paper at a temperature of 145°C and pressure of 0.5 kg/cm$^2$ for 1 second by means of a heat sealer manufactured by Toyo Tester Co., Ltd., Japan. After the application of pressure for adhesion, the sample was left to stand at 20°C and 65% RH for 24 hours and then cut into 25 × 150 mm. The adhesion strength of the sample was measured at a peel angle of 180° and peel velocity of 15 mm/min. (in an ambient of 20°C and 65% RH) on an Instron type tensile tester ("Tensilon," trade mark, manufactured by Toyo Sokki Co., Ltd., Japan). The results are given in Table 1.

Table 1

| Sample No. | Hydrogenation degree of aromatic ring | Adhesion strength (g/25 mm) | | |
|---|---|---|---|---|
| | | Cellophane | Glassine paper | Aluminum foil |
| 1 | 0 | 170 | 320 | 160 |
| 2 | 5 | 430 | 450 | 220 |
| 3 | 25 | 1000 | 470 | 250 |
| 4 | 53 | 1060 | 490 | 260 |
| 5 | 70 | 520 | 480 | 240 |
| 6 | 80 | 410 | 450 | 220 |
| 7 | 90 | 210 | 390 | 180 |
| 8 | 100 | 190 | 330 | 170 |
| 9 | (Perhydrogenated rosin ester) | 530 | 250 | 250 |

These results indicate that the use of the resins of this invention (Samples No. 2 to 6) with a hydrogenation degree of aromatic ring of 5 to 80 percent gives adhesion strength comparable or superior to that achieved by the rosin ester.

EXAMPLE 2

Preparation of hydrogenated aromatic petroleum hydrocarbon resin

Under agitation and water-bath cooling, 120 g of aluminum chloride powder was continuously added over a period of 1 hour to 12 Kg of a fraction of thermal cracked petroleum naphtha, having a composition given below and boiling in the range of 20° to 250°C. The mixture was further agitated for three hours with cooling with ice-water (i.e., at about 10°C), followed by the same procedure as in Example 1, which gave 4.8 Kg of a mass of aromatic hydrocarbon resin of brown color. The resin had Gardner color of 15, softening point of 95°C and molecular weight of 960.

Composition of the fraction

| Composition of the fraction | | |
|---|---|---|
| Butene | 4% | by weight |
| butadiene | 5% | " |
| pentene | 6% | " |
| various paraffins | 12% | " |
| cyclopentadiene | 5% | " |
| styrene | 4% | " |
| α-methylstyrene | 3% | " |
| vinyltoluene | 11% | " |
| indene | 8% | " |
| various alkylbenzenes | 30% | " |
| others | 12% | " |

Five hundred grams of the aromatic petroleum resin thus obtained was dissolved in the same amount of cyclohexane, and the solution was placed into a 2-liter autoclave and heated under a hydrogen pressure of 50 kg/cm$^2$ at various temperatures ranging from 200° to 250°C for various periods in the presence of 30 g of nickel-diatomaceous earch catalyst to prepare seven kinds of resins having various hydrogenation degrees.

Compatibility test

Figure 2:
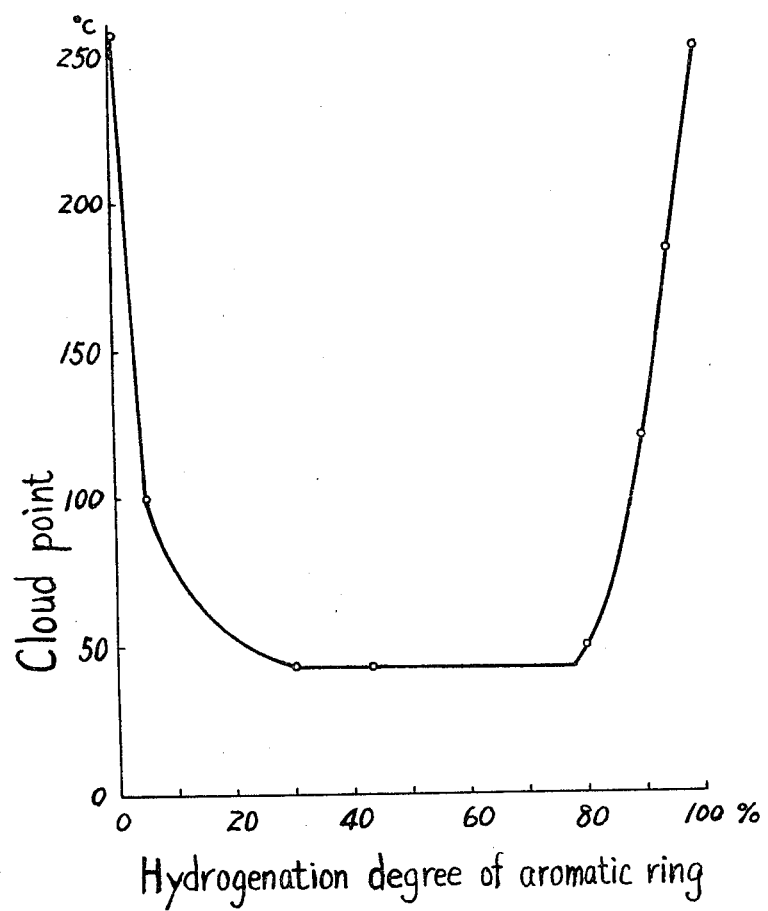

The seven kinds of the hydrogenated resins and unhydrogenated resin (the aromatic hydrocarbon resin prepared in Example 2) were tested in the same manner as in Example 1 except that microcrystalline wax was used in the place of paraffin wax HM-2050 to determine compatibility. The results are shown in FIG. 2, which indicates that the resins having hydrogenation degree of aromatic ring of 5 to 80 percent have excellent compatibility.

Preparation of hot-melt compositions

The resins thus obtained were used in the same manner as in Example 1 to prepare hot-melt compositions. The results are given in Table 2.

Table 2

| Sample No. | Hydrogenation degree of aromatic ring | Adhesion strength (g/25 mm) | | |
|---|---|---|---|---|
| | | Cellophane | Glassine paper | Aluminum foil |
| 9 | (Perhydrogenated resin ester) | 530 | 250 | 250 |
| 10 | 0 | 190 | 340 | 150 |
| 11 | 5 | 280 | 390 | 180 |
| 12 | 34 | 1170 | 480 | 270 |
| 13 | 43 | 1200 | 500 | 260 |
| 14 | 80 | 10000 | 470 | 160 |

Table 2-continued

| Sample No. | Hydrogenation degree of aromatic ring | Adhesion strength (g/25 mm) | | |
|---|---|---|---|---|
| | | Cellophane | Glassine paper | Aluminum foil |
| 15 | 90 | 250 | 370 | 160 |

What we claim is:
1. A hot-melt composition comprising 10 to 100 weight parts of a hydrogenated aromatic petroleum resin and 100 weight parts of an ethylene-unsaturated ester copolymer, said hydrogenated aromatic petroleum resin being prepared by polymerizing a cracked petroleum fraction boiling between −10° and 280°C and containing unsaturated hydrocarbons at least 50 percent by weight of which is polymerizable aromatic hydrocarbon and hydrogenating the resulting aromatic hydrocarbon resin to a hydrogenation degree of aromatic ring of 5 to 80 percent, and said ethylene-unsaturated ester copolymer being ethylene-unsaturated ester copolymer containing 60 to 90 weight percent of ethylene, said unsaturated ester being a member selected from the group consisting of vinyl acetate, methylacrylate and ethylacrylate.

2. The hot-melt composition according to claim 1, in which said hydrogenation degree of aromatic ring is in the range of 30 to 80 percent.

3. The hot-melt composition according to claim 1, in which said polymerizable aromatic hydrocarbon is at least one species selected from the group consisting of styrene, $\alpha$-methylstyrene, vinyl toluene, vinyl xylene, propenyl benzene, indene, methyl indene and ethyl indene.

4. The hot-melt composition according to claim 1, in which said unsaturated ester is vinyl acetate.

5. The hot-melt composition according to claim 1, which further contains a wax.

6. The hot-melt composition according to claim 1, which further contains rosin ester polyterpene, petroleum resin or coumarone-indene resin.

* * * * *